(12) United States Patent
Overton et al.

(10) Patent No.: US 8,135,252 B2
(45) Date of Patent: Mar. 13, 2012

(54) GREASE-FREE BUFFER OPTICAL FIBER BUFFER TUBE CONSTRUCTION UTILIZING A WATER-SWELLABLE, TEXTURIZED YARN

(75) Inventors: Bob Overton, Claremont, NC (US); Wayne Cheatle, Claremont, NC (US)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/916,337

(22) PCT Filed: Jul. 20, 2006

(86) PCT No.: PCT/US2006/028036
§ 371 (c)(1),
(2), (4) Date: Jul. 14, 2008

(87) PCT Pub. No.: WO2007/013923
PCT Pub. Date: Feb. 1, 2007

(65) Prior Publication Data
US 2008/0292262 A1    Nov. 27, 2008

Related U.S. Application Data

(60) Provisional application No. 60/700,751, filed on Jul. 20, 2005.

(51) Int. Cl.
G02B 6/00    (2006.01)
G02B 6/44    (2006.01)

(52) U.S. Cl. .................................. 385/100; 385/144

(58) Field of Classification Search .................. 385/100, 385/144
See application file for complete search history.

(56) References Cited

U.S. PATENT DOCUMENTS

| | | | |
|---|---|---|---|
| 4,296,058 A * | 10/1981 | Chen et al. | 264/78 |
| 4,913,517 A | 4/1990 | Arroyo et al. | |
| 4,974,926 A * | 12/1990 | Blee et al. | 385/107 |
| 5,133,034 A * | 7/1992 | Arroyo et al. | 385/107 |
| 5,182,779 A * | 1/1993 | D'Agostino et al. | 385/13 |
| 5,249,248 A * | 9/1993 | Arroyo et al. | 385/113 |
| 5,698,615 A | 12/1997 | Polle | |
| 6,003,565 A * | 12/1999 | Whittier et al. | 139/420 A |
| 6,212,739 B1 * | 4/2001 | Crook et al. | 24/33 P |
| 6,253,012 B1 * | 6/2001 | Keller et al. | 385/109 |
| 2001/0027946 A1 * | 10/2001 | Fukuda et al. | 210/505 |
| 2005/0129347 A1 * | 6/2005 | Saito et al. | 385/14 |

OTHER PUBLICATIONS

Chinese Office Action dated Jun. 5, 2009.

* cited by examiner

*Primary Examiner* — Ryan Lepisto
*Assistant Examiner* — Jerry Blevins
(74) *Attorney, Agent, or Firm* — Sughrue Mion, PLLC

(57) ABSTRACT

A buffered optical fiber arrangement that includes a buffer tube in which is provided optical fibers and a texturized yarn coated with a water-swellable material. The filament diameter of the yarn used in the present invention may be between about 5 microns and about 100 microns, more preferably between about 10 and about 60 microns, still more preferably between about 20 and about 40 microns. The linear density, or denier in grams per 9000 meters, of the base yarn may be between about 100 and 1000, more preferably between about 200 and 600, or still more preferably between about 250 and 350. The degree of decrease in length (the "degree of texturizing") between the perfectly straight filaments before texturizing and the texturized filament may be between 1 percent and 90 percent, more preferably between about 2 percent and 50 percent, or still more preferably between about 5 percent and 25 percent.

19 Claims, 3 Drawing Sheets

GREASE-FREE BUFFER OPTICAL FIBER BUFFER TUBE CONSTRUCTION UTILIZING A WATER-SWELLABLE, TEXTURIZED YARN

CROSS-REFERENCE TO RELATED APPLICATIONS

This application claims the benefit of U.S. Provisional Application No. 60/700,751, filed in the United States Patent and Trademark Office on Jul. 20, 2005. That application is hereby incorporated herein by reference in its entirety.

BACKGROUND OF THE INVENTION

Optical fiber cables typically include optical fibers or ribbons provided in buffer tubes. For water blocking purposes, the buffer tube includes either a filling gel or a water-swellable material, such as a water-swellable yarn. Water-swellable yarns typically comprise granular powder glued to a polyester carrier yarn or polyacrylate filaments that are bundled onto polyester carrier yarns. However, due to their irregular geometry and granularity, the particles of powder on the carrier yarn in the first instance can damage the performance of the optical fibers. Also, with respect to the water-swellable filaments spun with polyester yarns, too much bulk must be added inside the tubes.

SUMMARY OF THE INVENTION

The invention comprises a buffered optical fiber arrangement that includes a buffer tube in which is provided optical fibers and a texturized yarn coated with a water-swellable material. The filament diameter of the yarn used in the present invention may be between about 5 microns and about 100 microns, more preferably between about 10 and about 60 microns, still more preferably between about 20 and about 40 microns. The linear density, or denier expressed in grams per 9000 meters, of the base yarn may be between about 100 and 1000, more preferably between about 200 and 600, or still more preferably between about 250 and 350. The degree of decrease in length (the "degree of texturizing") between the perfectly straight filaments before texturizing and the texturized filament may be between 1 percent and 90 percent, more preferably between about 2 percent and 50 percent, or still more preferably between about 5 percent and 25 percent.

DETAILED DESCRIPTION OF THE INVENTION

Figure 1:
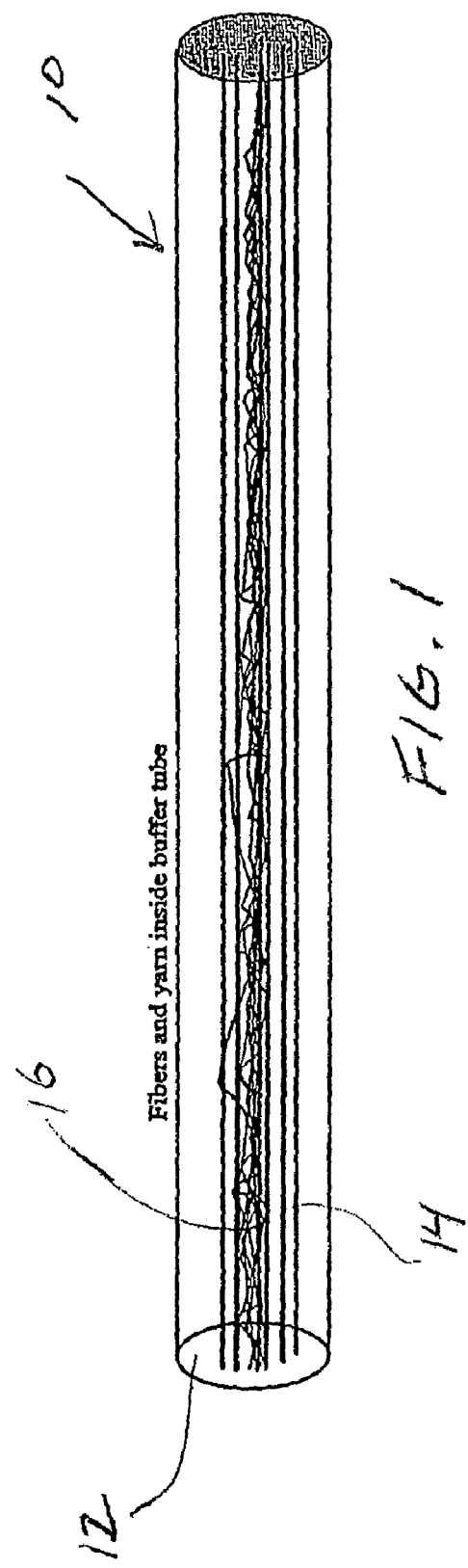
FIG. 1 is a schematic illustration of a buffer tube containing the optical fibers and yarns according to the present invention.

With reference to FIG. 1, the buffered optical fiber arrangement 10 according to an embodiment of the present invention includes a buffer tube 12 containing optical fibers 14 and an improved yarn 16 according to the present invention. The yarn 16 comprises a texturized filament structure using, for example, polyester filaments coated with water-swellable material, such as polyacrylate from a methanol or other solvent solution, after which the solvent is driven off. The solvent coating system provides very small, very smooth and generally spherical domains of polyacrylate on the carrier yarn that do not apply point stresses to the optical fibers, while integrating the water-swellable component with the carrier yarn. According to the invention, the yarn is texturized so that when the yarn is not under tension it assumes a fluffy configuration, further easing the stresses on the optical fibers. An example of a low-denier, texturized yarn product for use in the present invention is M40-50 Dry Core Yarn manufactured by Fil-Tec.

Figure 2:
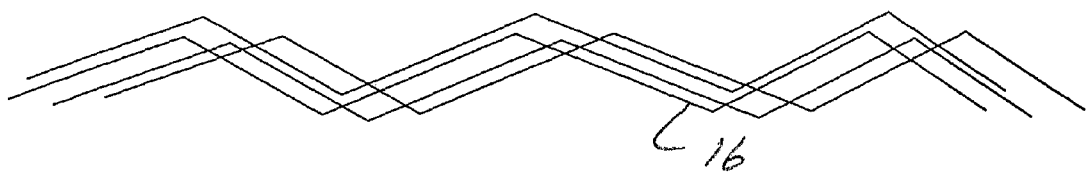
FIG. 2 is a schematic illustration showing the texturized yarn according to the present invention.

In more detail, according to the invention, the carrier yarn is a "texturized" bundle of filaments. This differentiates this water-swellable yarn for use in the present invention from other commonly used yarns, which are not texturized. The filaments may be formed of any of the group including, but not limited to, polyvinyl alcohols, polyolefins, polycarbonates, polyamides, polyimides, polyaramids, polyesters or mixtures thereof. Texturizing is a process in which the filaments are crimped while heated above their glass transition temperature so that their relaxed length is decreased without decreasing the diameters, illustrated in FIG. 2. The filament diameter of the yarn used in the present invention may be between about 5 microns and about 100 microns, more preferably between about 10 and about 60 microns, still more preferably between about 20 and about 40 microns. The linear density, or denier in grams per 9000 meters, of the base yarn may be between about 100 and 1000, more preferably between about 200 and 600, or still more preferably between about 250 and 350. The degree of decrease in length (the "degree of texturizing") between the perfectly straight filaments before texturizing and the texturized filament may be between 1 percent and 90 percent, more preferably between about 2 percent and 50 percent, or still more preferably between about 5 percent and 25 percent. It has been found by the inventors that the process of adding the water-swellable material to the carrier yarn after it has been texturized may affect the degree of texturizing left in the final product.

The water-swellable material may be any of a number of well-known water-absorbing materials such as poly(sodium acrylate). Further, the water-swellable material may be adhered to the filaments by any of the known methods for adhering coatings to filaments.

The linear density of the final product is the sum of the weight of the base yarn, the weight of the water-swellable material and the weight of the adhering material, expressed in grams per 9000 meters of water-swellable yarn. This linear density may be between about 300 and 1200, more preferably between about 400 and 800, still more preferably between about 300 and 650, or still more preferably between about 500 and 600.

The 540 denier version of the texturized and coated yarn of the present invention has been demonstrated to water-block 2.5 mm buffer tubes with 12 fibers very effectively. There is no loose powder. The 540 denier yarn becomes fluffy when tension is released, unlike the non-texturized carrier yarns mixed in with polyacrylate filaments. The mixed yarns, using no powders but rather polyacrylate filaments plus polyester yarn are typically 1500 denier or higher in weight, which is very bulky, placing lateral stresses on the optical fibers. The inventors have also tested polyester threads and aramid threads with water-swellable powders glued to the threads and found that the resulting product experiences high loss in temperature cycling. The low-denier, texturized and specially coated yarn of the present invention induces far less stress on the fibers.

The water-swellable material is deposited on the yarn in such a way that the geometry of the water-swellable material is generally spherical and smooth-surfaced. This differentiates this yarn from other water-swellable yarns that typically comprise a) filaments of water-swellable material bundled with the base yarn or b) particles of water-swellable material of irregular shapes bonded to the base yarn. In the former alternative art, the overall diameter of the base yarn plus bundled filaments is much greater than the yarn utilized in the present invention. The linear density of these yarns is typically 1500 grams per 9000 meters. In the latter alternative art, the particles bonded to the filaments comprise a much larger range of diameter than in the yarn utilized in the present invention. Further, the base yarn is not crimped or texturized. Also, the particles are of irregular shape and not smoothly spherical like the water-swellable material bonded to the base yarn of the present invention. The result of using the water-swellable yarn of the present invention is that much less space is required inside the buffer tube, leaving more space for the fibers, and the water-swellable particles are much less likely to be able to apply significant lateral, point stresses on the fibers that would result in microbending-induced loss of signal in the optical fibers.

Figure 3:
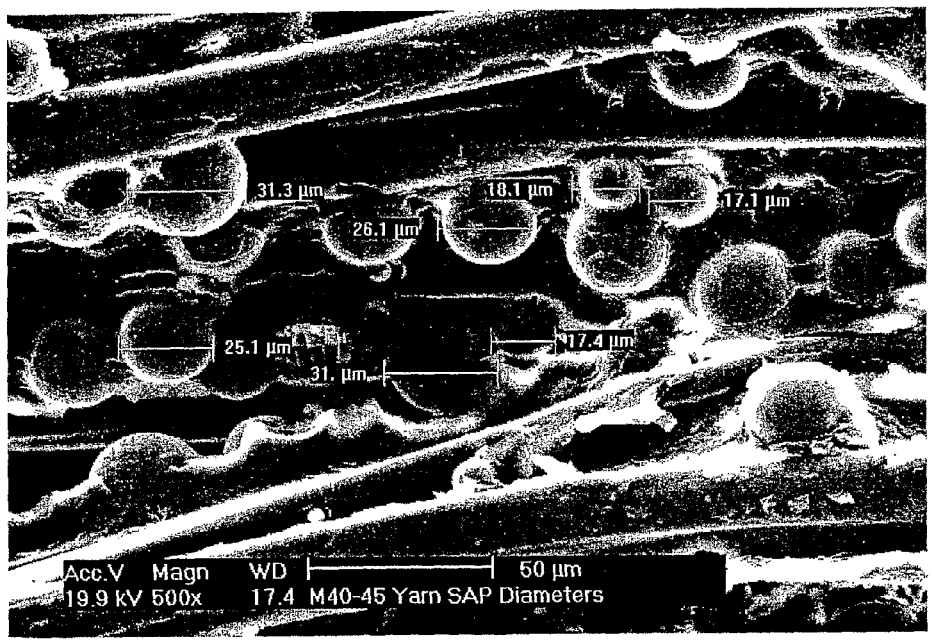
FIG. 3 is an illustration showing the relative dimensions of the spherical particles used in the present invention.

The smoothly spherical particles of the water-swellable material bonded to the yarn utilized in the present invention comprise a distribution in which 95% of the particles fall into a range of from about 1 to 200 microns in diameter, more preferably from about 2 to about 100 microns in diameter, still more preferably from about 5 to about 40 microns in diameter. FIG. 3 illustrates the relative dimensions of the spherical particles and the filaments to which they are bonded.

The capacity of the water-swellable thread to take up water is expressed as the multiple of the dry weight of the thread obtained when the thread is allowed to take up water, with excess water not captured by the water-swellable material removed. For example, the water-swell capacity may be 40× the dry weight of the thread, meaning that when the water-swellable material has absorbed an amount of water over a defined period of water exposure that amount of water weighs 40× the dry weight of the thread. The method for obtaining this measurement is as follows.

A circular filter paper is fitted to the bottom of a standard 75 mm diameter Buechner funnel that is fitted through a cork into the neck of an aspirator flask. The filter paper is thoroughly wetted, and the Buechner funnel is aspirated for 5 seconds to remove excess water. The damp filter paper is immediately weighed and that weight recorded, then the filter is positioned again into the Buechner funnel. A 2.0 meter length of the water-swellable tape is coiled, weighed, and placed in the Buechner funnel on top of the filter paper. The Buechner funnel is inserted into a beaker of water so that the water comes up the tip of the funnel, through the holes in the bottom of the funnel cup and just covers the coiled water-swellable tape. This position is held for 30 seconds, and the funnel is removed from the water. The free water is allowed to drain through the funnel. The funnel and contents are placed into the aspirator flask, and the flask is again aspirated for 5 seconds. The filter and water-swellable tape are removed and reweighed all together. The original weight of the damp filter paper and the dry water-swellable tape are subtracted from the total weight to obtain the weight of the water absorbed by the water-swellable thread.

Using the above method, the amount of water absorbed by the water-swellable thread used in the present invention may be between 10 and 100 times the dry weight of the thread, more preferably between 20 and 80 times the dry weight of the thread, still more preferably between 40 and 60 times the dry weight of the thread.

Figure 4:
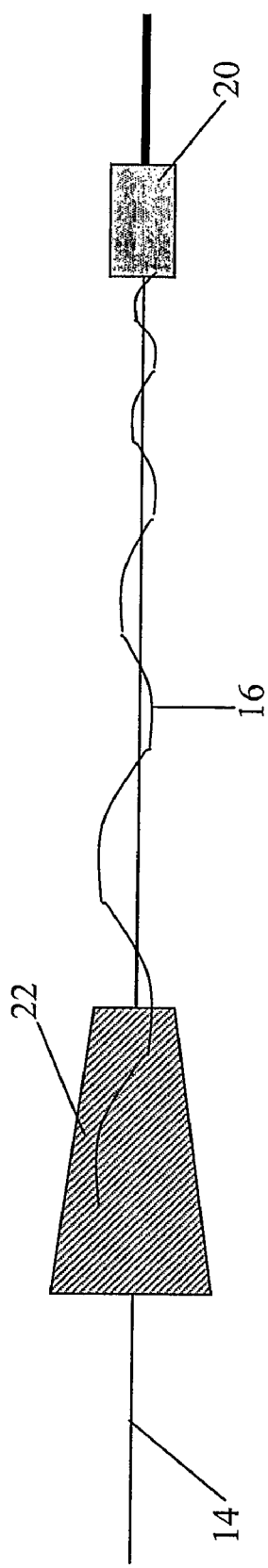
FIG. 4 is a schematic illustration showing the process of forming the buffer tube with the optical fibers and texturized yarn according to the present invention.

With reference to FIG. 4, the method of forming the buffered optical fiber arrangement includes delivering the texturized and coated yarn 16 to a cross head 20 in a relaxed (i.e., untensioned) state such that the buffer tube 12 is formed around the yarn 16 and the optical fibers 14 with the yarn in a relaxed state. The natural shrink-back of the buffer tube in the downstream cooling water further guarantees the full recovery of the yarn to provide a cushion for the fibers. Here, the texturized and coated yarn is delivered by flying off from a cob 22 and follows a helical path around the fibers while under minimum tension. Thereafter, as the diameter of the yarn helix decreases the tension on the yarn is further relaxed as it enters the cross-head.

According to the present invention, the buffered optical fiber arrangement may be incorporated in a cable in the conventional manner. Also, it is understood that the optical fibers can be arranged as loose fibers or in a ribbon-like manner.

What is claimed is:

1. A buffered optical fiber arrangement, comprising:
   a buffer tube;
   a plurality of optical fibers provided in the buffer tube; and
   a texturized yarn provided in the buffer tube along the optical fibers, said texturized yarn being coated with a water-swellable material,
   wherein the texturized yarn comprises a bundle of filaments which are crimped while heated above their glass transition temperature, and
   wherein the filament diameter of the texturized yarn is between about 20 and about 40 microns.

2. The buffered optical fiber arrangement of claim 1, wherein linear density in grams per 9000 meters of the carrier yarn is between about 100 and 1000.

3. The buffered optical fiber arrangement of claim 1, wherein the yarn is texturized such that the degree of decrease in length of the yarn from a tensioned state and a relaxed state is between 1 percent and 90 percent.

4. The buffered optical fiber arrangement of claim 1, wherein the water-swellable material is poly(sodium acrylate).

5. The buffered optical fiber arrangement of claim 1, wherein the linear density of the coated texturized yarn is in grams per 9000 meters is between about 300 and 1200.

6. The buffered optical fiber arrangement of claim 1, wherein the water-swellable material comprises substantially spherical particles.

7. The buffered optical fiber arrangement of claim 6, wherein a distribution of the particles is such that 95% of the particles fall into a range of from about 1 to 200 microns in diameter.

8. The buffered optical fiber arrangement of claim 6, wherein a distribution of the particles is such that 95% of the particles fall into a range of from about 2 to about 100 microns in diameter.

9. The buffered optical fiber arrangement of claim 6, wherein a distribution of the particles is such that 95% of the particles fall into a range of from about 5 to about 40 microns in diameter.

10. The buffered optical fiber arrangement of claim 1, wherein said texturized yarn is in an untensioned state.

11. The buffered optical fiber arrangement of claim 10, wherein a distance that said yarn extends along said buffer tube is less than a length of said yarn in a tensioned state.

12. The buffered optical fiber arrangement of claim 1, wherein the filament diameter of the texturized yarn is between about 10 and about 60 microns.

13. The buffered optical fiber arrangement of claim 1, wherein linear density in grams per 9000 meters of the carrier yarn is between about 200 and 600.

14. The buffered optical fiber arrangement of claim 1, wherein linear density in grams per 9000 meters of the carrier yarn is between about 250 and 350.

15. The buffered optical fiber arrangement of claim 1, wherein the yarn is texturized such that the degree of decrease in length of the yarn from a tensioned state and a relaxed state is between about 2 percent and 50 percent.

16. The buffered optical fiber arrangement of claim 1, wherein the yarn is texturized such that the degree of decrease in length of the yarn from a tensioned state and a relaxed state is between about 5 percent and 25 percent.

17. The buffered optical fiber arrangement of claim 1, wherein the linear density of the coated texturized yarn is in grams per 9000 meters is between about 400 and 800.

18. The buffered optical fiber arrangement of claim 1, wherein the linear density of the coated texturized yarn is in grams per 9000 meters is between about 300 and 650.

19. The buffered optical fiber arrangement of claim 1, wherein the linear density of the coated texturized yarn is in grams per 9000 meters is between about between about 500 and 600.

* * * * *